(12) United States Patent
Son

(10) Patent No.: US 8,195,208 B2
(45) Date of Patent: Jun. 5, 2012

(54) SYSTEM AND METHOD FOR TRANSMITTING AND RECEIVING RANGING INFORMATION IN SLEEP MODE IN A COMMUNICATION SYSTEM

(75) Inventor: Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 780 days.

(21) Appl. No.: 12/274,902

(22) Filed: Nov. 20, 2008

(65) Prior Publication Data
US 2009/0137260 A1 May 28, 2009

(30) Foreign Application Priority Data

Nov. 27, 2007 (KR) .................. 10-2007-0121664

(51) Int. Cl.
*H04Q 7/20* (2006.01)
(52) U.S. Cl. ........................ 455/466; 370/311
(58) Field of Classification Search ............ 455/436
See application file for complete search history.

(56) References Cited

U.S. PATENT DOCUMENTS

2010/0254291 A1* 10/2010 Youn et al. ............ 370/311

OTHER PUBLICATIONS

IEEE 802.16 Broadband wireless Access Working Group, the Unified TLV encoding for DCD and UCD in OFDMA PHY mode, Nov. 1, 2004.*
IEEE Std 802.16e-2005, part 16: Air Interface for Fixed and Mobile Broadband Wireless Access System, Amendment 2: PHY/MAC for combined Fixed and Mobile Operation in Licensed Bands.*

* cited by examiner

*Primary Examiner* — Charles Shedrick
(74) *Attorney, Agent, or Firm* — Jefferson IP Law, LLP

(57) ABSTRACT

A Base Station (BS) for transmitting a ranging response message to a Mobile Station (MS) in a communication system is provided. The ranging response message comprises a Unified Type-Length-Value (TLV) encoding for a power saving class parameter. The Unified TLV encoding comprises only a value parameter for each of a plurality of Information Elements (IEs) used for defining a power saving class.

28 Claims, 3 Drawing Sheets

| Name | Type (1 byte) | Length | Value (Variable-Length) | |
|---|---|---|---|---|
| Unified TLV encoding for Power Saving Class Parameters | 12 | Variable | Parameters | Bits |
| | | | Operation | 1 |
| | | | Definition | 1 |
| | | | Power_Saving_ClassID | 6 |
| | | | If(Operation==1) { | |
| | | |    Start_Frame_Number | 7 |
| | | |    Stop_CQI_Allocation_Flag | 1 |
| | | | } | |
| | | | If(Definition) { | |
| | | |    Power_Saving Class Type | 2 |
| | | |    TRF-IND_Required | 1 |
| | | |    Traffic_Triggered_Wakening_flag | 1 |
| | | |    Direction | 2 |
| | | |    MDHO/FBSS_Support | 1 |
| | | |    Initial-Sleep Window | 8 |
| | | |    Listening-Window | 8 |
| | | |    Final Sleep Window base | 10 |
| | | |    Final Sleep Window exponent | 3 |
| | | |    If(TRF-IND_Required==1) { | |
| | | |      SLPID | 10 |
| | | |      *Reserved* | 2 |
| | | |    } | |
| | | |    Number_of_CIDs | 4 |
| | | |    For(i=0; i<Number_of_CIDs; i++) { | |
| | | |      CID | 16 |
| | | |    } | |
| | | |    If(MDHO/FBSS_Support==1) | |
| | | |      MDHO/FBSS duration(s) | 3 |
| | | |      *Reserved* | 1 |
| | | |    } | |
| | | | } | |
| | | | Padding for byte alignmant | 0 or 4 |

| Name | Type (1 byte) | Length | Value (Variable-Length) | |
|---|---|---|---|---|
| Unified TLV encoding for Power Saving Class Parameters | 12 | Variable | Parameters | Bits |
| | | | Operation | 1 |
| | | | Definition | 1 |
| | | | Power_Saving_ClassID | 6 |
| | | | If(Operation==1) { | |
| | | |     Start_Frame_Number | 7 |
| | | |     Stop_CQI_Allocation_Flag | 1 |
| | | | } | |
| | | | If(Definition) { | |
| | | |     Power_Saving Class Type | 2 |
| | | |     TRF-IND_Required | 1 |
| | | |     Traffic_Triggered_Wakening_flag | 1 |
| | | |     Direction | 2 |
| | | |     MDHO/FBSS_Support | 1 |
| | | |     Initial-Sleep Window | 8 |
| | | |     Listening-Window | 8 |
| | | |     Final Sleep Window base | 10 |
| | | |     Final Sleep Window exponent | 3 |
| | | |     If(TRF-IND_Required==1) { | |
| | | |         SLPID | 10 |
| | | |         *Reserved* | 2 |
| | | |     } | |
| | | |     Number_of_CIDs | 4 |
| | | |     For(i=0; i<Number_of_CIDs; i++) { | |
| | | |         CID | 16 |
| | | |     } | |
| | | |     If(MDHO/FBSS_Support==1) | |
| | | |         MDHO/FBSS duration(s) | 3 |
| | | |         *Reserved* | 1 |
| | | |     } | |
| | | | } | |
| | | | Padding for byte alignmant | 0 or 4 |

FIG.2

| Name | Type (1 byte) | Length | Value (Variable-Length) | |
|---|---|---|---|---|
| Unified TLV encoding for Power Saving Class Parameters | 12 | Variable | Parameters | Bits |
| | | | Operation | 1 |
| | | | Definition | 1 |
| | | | Power_Saving_ClassID | 6 |
| | | | If(Operation==1) { | |
| | | |    Start_Frame_Number | 7 |
| | | |    Stop_CQI_Allocation_Flag | 1 |
| | | | } | |
| | | | If(Definition) { | |
| | | |    Power_Saving Class Type | 2 |
| | | |    Direction | 2 |
| | | |    MDHO/FBSS_Support | 1 |
| | | |    Reserved | 8 |
| | | |    If(Power_Saving Class Type==1) { | |
| | | |      TRF-IND_Required | 1 |
| | | |      Traffic_Triggered_Wakening_flag | 1 |
| | | |      If(TRF-IND_Required==1) { | |
| | | |        SLPID | 10 |
| | | |      } | |
| | | |      Else { | |
| | | |        *Reserved* | 2 |
| | | |      } | |
| | | |    } | |
| | | |    If(Power_Saving Class Type !=8) { | |
| | | |      Initial-Sleep Window | 8 |
| | | |      Listening-Window | 8 |
| | | |    } | |
| | | |    If(Power_Saving Class Type !=2) { | |
| | | |      Final Sleep Window base | 10 |
| | | |      Final Sleep Window exponent | 8 |
| | | |      *Reserved* | 8 |
| | | |    } | |
| | | |    Number_of_CIDs | 4 |
| | | |    For(i=0, i<Number_of_CIDs; i++) { | |
| | | |      CID | 18 |
| | | |    } | |
| | | |    If(MDHO/FBSS_Support==1) | |
| | | |      MDHO/FBSS duration(s) | 8 |
| | | |      *Reserved* | 1 |
| | | |    } | |
| | | | } | |
| | | | Padding for byte alignment | 0 |

FIG.3

SYSTEM AND METHOD FOR TRANSMITTING AND RECEIVING RANGING INFORMATION IN SLEEP MODE IN A COMMUNICATION SYSTEM

PRIORITY

This application claims the benefit under 35 U.S.C. §119 (a) of a Korean patent application filed in the Korean Intellectual Property Office on Nov. 27, 2007 and assigned Serial No. 10-2007-0121664, the entire disclosure of which is hereby incorporated by reference.

BACKGROUND OF THE INVENTION

1. Field of the Invention

The present invention relates to a communication system. More particularly, the present invention relates to a system and method for transmitting and receiving ranging information in a sleep mode in a communication system.

2. Description of the Related Art

Generally, communication systems are being developed to support services capable of transmitting and receiving a large volume of data to/from Mobile Stations (MSs) at high speed. An example of the communication systems comprises an Institute of Electrical and Electronics Engineers (IEEE) 802.16e communication system. The IEEE 802.16e communication system provides a normal mode operation in which communication is continually maintained between an MS and a Base Station (BS).

In the IEEE 802.16e communication system, an MS is always monitoring the DownLink (DL) to receive data from a BS. Accordingly, when the BS has no data to transmit to the MS or when the MS has no data to transmit to the BS, the MS continuously monitors the downlink and is therefore constantly consuming power. Thus, the MS is undesirably consuming power when the BS has no data to transmit to the MS or when the MS has no data to transmit to the BS. In particular, since the IEEE 802.16e communication system considers mobility of the MS, the power consumption of the MS acts as an important factor in the performance of the entire system. Therefore, a sleep mode operation between an MS and a BS, and an awake mode operation corresponding to the sleep mode operation have been proposed to minimize the MS's power consumption. In addition, to cope with a change in the state of a channel between the BS and the MS, the MS periodically performs a ranging operation with the BS in order to correct a timing offset, a frequency offset and a power level.

With reference to FIG. 1, a description will now be made of a conventional message exchange process between an MS and a BS in a sleep mode operation performed in a communication system.

FIG. 1 is a diagram illustrating a conventional process of performing a sleep mode operation in a communication system.

Referring to FIG. 1, when an MS 100 desires to transition from the awake mode to the sleep mode, the MS 100 transmits a MOBile_SLeeP-REQuest (MOB_SLP-REQ) message to a BS 110 in step 101. Upon receipt of the MOB_SLP-REQ message, the BS 110 determines whether it will grant the transition to the sleep mode of the MS 100 considering a state of the BS 110 itself and a state of the MS 100, and transmits a MOBile_SLeeP-ReSPonse (MOB_SLP-RSP) message to the MS 100 according to a result of the determination in step 103. Herein, the MOB_SLP-RSP message comprises a Listening Window parameter. Further, if the BS 110 has data to transmit to the MS 100 in the listening window of the sleep mode, the BS 110 transmits a MOBile_TRaFfic-INDication (MOB_TRF-IND) message comprising an identifier of the MS 100 to the MS 100 in the listening window.

Upon receiving the MOB_SLP-RSP message from the BS 110, the MS 100 starts a sleep mode operation according to the MOB_SLP-RSP message. The MS 100 recognizes the operation it will perform according to the Listening Window parameter included in the MOB_SLP-RSP message. In addition, even though the MS 100 is operating in the sleep mode, the MS 100 can immediately transition from the sleep mode to the awake mode when the MS 100 has data to transmit to the BS 110.

Meanwhile, the BS 110 transmits a MOB_TRF-IND message in the listening window of the sleep mode in step 105. Herein, the MS's identifier may not be comprised in the MOB_TRF-IND message. In this case, since the MOB_TRF-IND message is a message that does not correspond to the MS 100, the MS 100 decodes the MOB_TRF-IND message, and then again performs the sleep mode operation, upon determining that its identifier is not comprised in the message.

After a lapse of a predefined amount of time, if the BS 110 has data to transmit to the MS 100 in the listening window of the sleep mode, it transmits a MOB_TRF-IND message comprising an identifier of the MS 100 to the MS 100 in step 107. Since the MOB_TRF-IND message is a message corresponding to the MS 100, the MS 100 decodes the MOB_TRF-IND message, and then transitions to the awake mode and receives the data from the BS 110, upon determining that its identifier is comprised in the message.

After the data transmission/reception of the MS 100 and the BS 110 is completed, the MS 100 and the BS 110 again exchange a MOB_SLP-REQ message and a MOB_SLP-RSP message in order to transition back to the sleep mode. Since the MS 100 and the BS 110 exchange the MOB_SLP-REQ message and the MOB_SLP-RSP message for the mode transition to the sleep mode, they perform an unnecessary transmission of the messages, causing a waste of UpLink (UL) and DL resources and power consumption. In addition, the MS 100 performs bandwidth ranging by transmitting a BandWidth-REQuest (BW-REQ) message in order to be allocated a bandwidth over which it will transmit the MOB_SLP-REQ message to the BS 110. Thus, the MS 100 may delay the time required for performing a mode transition to the sleep mode.

Meanwhile, the IEEE 802.16e communication system defines the following messages in order to support the above-stated sleep mode operation and awake mode operation.

(1) MOB_SLP-REQ Message

The MOB_SLP-REQ message is a message that the MS transmits to the BS when the MS 100 desires to transition from the awake mode to the sleep mode. The MOB_SLP-REQ message comprises therein the parameters, or Information Elements (IEs), that the MS requires to make a mode transition to the sleep mode, and an exemplary format of the MOB_SLP-REQ message is shown in Table 1.

TABLE 1

| Syntax | Size (bits) | Notes |
|---|---|---|
| MOB_SLP-REQ_Message_format( ) { | | |
|   Management message type = 50 | 8 | |
|   Number of Classes | 8 | Number of power saving classes. |
|   for (i=0; i<Number of Classes; i++) { | | |
|     Definition | 1 | |
|     Operation | 1 | |
|     Power_Saving_Class_ID | 6 | |

TABLE 1-continued

| Syntax | Size (bits) | Notes |
|---|---|---|
| if (Operation = 1) { | | |
|   Start_frame_number | 6 | |
|   Reserved | 2 | |
| { | | |
| if (Definition = 1) { | | |
|   Power_Saving_Class_Type | 2 | |
|   Direction | 2 | |
|   Traffic_triggered_wakening_flag | 1 | |
|   Reserved | 3 | |
|   Initial-sleep window | 8 | |
|   listenting-window | 8 | |
|   final-sleep window base | 10 | |
|   final-sleep window exponent | 3 | |
|   Number_of_Sleep_CIDs | 3 | |
|   for (i=0; i<Number_of_Sleep_CIDs; i++) | | |
| { | | |
|   CID | 16 | |
| } | | |
| } | | |
| TLV encoded information | variable | |
| } | | |

As shown in Table 1, the exemplary MOB_SLP-REQ message comprises a plurality of IEs.

'Management Message Type' refers to information indicating a type of the transmission message. When 'Management Message Type' is 50, it denotes that the transmission message is the MOB_SLP-REQ message. 'Number of Classes' refers to information indicating the number of power saving classes to be comprised in the MOB_SLP-REQ message. 'Definition' refers to information indicating one of a definition of a new power saving class or a definition of an old class.

'Operation' refers to information indicating whether the power saving class is activated or deactivated. 'Power_Saving_Class_ID' refers to information indicating an identifier for indicating a power saving class indicating the current operation. 'Start_Frame_Number' refers to information indicating the time that a corresponding power saving class is to be activated.

When 'Definition' is 1, IEs indicating characteristics of the corresponding Power_Saving_Class_ID are as follows.

<1> Power_Saving_Class_Type: It refers to information indicating a type of a corresponding power saving class. Herein, types of the corresponding power saving class are as follows.

1) Type 1: It is a class based on the conventional sleep mode operation. That is, the MS transitions to the awake mode when data transmission/reception occurs in a listening window or when it receives a MOB_TRF-IND message comprising an affirmative indication.

2) Type 2: It is a class that has a fixed sleep window, performs data transmission/reception in a listening window, and performs data transmission/reception in the next listening window after the fixed sleep window.

3) Type 3: While Type 1 and Type 2 continually maintain the sleep mode unless a mode transition request message is received, Type 3 denotes a class that automatically ends the sleep mode after one sleep mode operation, i.e., after one sleep window. It may be used for a management message or multicast traffic.

<2> Direction: It refers to information indicating uplink or downlink.

<3> TRF-IND_Required: The TRF-IND_Required refers to information indicating use/nonuse of the MOB_TRF-IND message when it is necessary to deactivate a corresponding power saving class of the MS. If it is necessary to use the MOB_TRF-IND message, the BS allocates a SLeeP Identifier (SLPID) to the MS. Then the MS receives a MOB_TRF-IND message from the BS during the listening window, and checks existence/nonexistence of the SLPID which is mapped to the corresponding power saving class. In this manner, the MS determines whether it will deactivate the corresponding power saving class.

<4> Traffic_Triggered_Wakening_Flag (TTWF): It is applied only to Type 1, which is a type of the corresponding power saving class indicated by the above-stated power saving class type.

More specifically, the TTWF is used when the MS desires to maintain the sleep mode even though data occurs in the listening window. That is, when the TTWF is 0, the MS transmits/receives data during the listening window, and transitions back to the sleep mode at the time the listening window expires, i.e., at the time the sleep window starts.

When the BS desires to transmit a Medium Access Control (MAC) Service Data Unit (SDU) for a corresponding power saving class during the listening window, when the MS transmits a BW-REQ message for a connection for the corresponding power saving class, or when the MS receives a MOB_TRF-IND message comprising affirmative indication, i.e., an identifier of the MS, from the BS, the MS can end the sleep mode and then transition to the awake mode. Alternatively, the MS can end the sleep mode through transmission/reception of the MOB_SLP-REQ message and the MOB_SLP-RSP message.

Meanwhile, when the TTWF is 1, the MS should unconditionally end the sleep mode and make a mode transition to the awake mode, when it receives a Packet Data Unit (PDU) from the BS during the listening window, or when it receives a management message for ending the sleep mode, for example, a MOB_SLP-RSP message or a DL Sleep Control Extended Subheader (SCES).

In addition, the MS should unconditionally end the sleep mode and make a mode transition to the awake mode when data occurs in the MS itself or when it transmits to the BS a management message for ending the sleep mode, i.e., a MOB_SLP-REQ message or a bandwidth request message with a UL Sleep Control Header (SCH). In other words, for TTWF=1, the MS transitions to the awake mode when traffic occurs during the listening window or when a management message occurs.

As described above, the TTWF is used when the MS desires to maintain the sleep mode and perform data transmission/reception during the listening window, according to Type 1 or Type 2 which is a type of the corresponding power saving class.

<5> Initial-Sleep Window: It refers to information indicating a start value that starts the sleep window.

<6> Listening Window: It refers to information indicating a required listening window. The MS receives a MOB-TRF-IND message from the BS when it transmits/receives traffic during the listening window, or when the TRF-IND_Required is 1.

<7> Maximum Sleep Window: The maximum value of the sleep window is determined using a final-sleep window base and a final-sleep window exponent, i.e., using two parameters. That is, the maximum sleep window value is determined as (final-sleep window base)*2^(final-sleep window exponent).

<8> Number_of_CIDs: It refers to information indicating the total number, Number_of_Sleep_Connection IDs, of sleep Connection Identifiers (CIDs) associated with the corresponding power saving class, and indicates the number of unicast CIDs. <9> CID: It denotes a sleep CID associated with the corresponding power saving class.

(2) MOB_SLP-RSP Message

The MOB_SLP-RSP message is a message that the BS transmits to the MS along with information indicating whether it will grant an MS's mode transition to the sleep mode considering a state of the BS itself and a state of the MS, or a message that the BS transmits to the MS along with an unsolicited instruction. The MOB_SLP-RSP message comprises therein the parameters, or IEs, that the MS requires to operate in the sleep mode, and an exemplary format of the MOB_SLP-RSP message is shown in Table 2.

TABLE 2

| Syntax | Size (bits) | Notes |
|---|---|---|
| MOB SLP RSP Message format( ) { | | |
|   Management message type = 51 | 8 | |
|   Number of Classes | 8 | Number of power saving classes |
|   for (i=0; i<Number_of_Classes; i++) { | | |
|     Length of data | 7 | |
|     Sleep Approved | 1 | |
|     Definition | 1 | |
|     Operation | 1 | |
|     Power_Saving_Class_ID | 6 | |
|     if (Sleep Approved == 1) { | | |
|       if (Operation = 1) { | | |
|         Start_frame_number | 6 | |
|         Reserved | 2 | |
|       } | | |
|     if (Defintion = 1) { | | |
|       Power_Saving_Class_Type | 2 | |
|       Direction | 2 | |
|       Initial-sleep window | 8 | |
|       listening window | 8 | |
|       final-sleep window base | 10 | |
|       final-sleep window exponent | 3 | |
|       TRF-IND required | 1 | |
|       Traffic_triggered_wakening_flag | 1 | |
|       Reserved | 1 | |
|       if (TRF-IND required) { | | |
|         SLPID | 10 | |
|         Reserved | 2 | |
|       } | | |
|       Number of CIDs | 1 | |
|       for (i=0; i<Number_of_CIDs; i++) { | | |
|         CID | 16 | |
|       } | | |
|       if (MHDO or FBSS capability enabled) { | | If MHDO or FBSS capability is enabled in the REG-REQ/RSP message exchange |
|         Maintain Diversity Set and Anchor BS | 1 | |
|         if (Maintain Diversity Set and Anchor BS) { | | |
|           MHDO/FBSS duration(s) | 3 | |
|         } | | |
|       } | | |
|     } | | |
|     Padding | variable | If needed for alignment to byte boundary |
|     if (Operation = 1) { | | |
|       Power Saving Class TLV encoded information | variable | |
|     } | | |

TABLE 2-continued

| Syntax | Size (bits) | Notes |
|---|---|---|
|   }else{ | | In case Sleep Approved == 0 |
|     REQ-duration | 8 | |
|   } | | |
|   TLV encoded information | variable | |
| } | | |

As shown in Table 2, the exemplary MOB_SLP-RSP message comprises a plurality of IEs. The MOB_SLP-RSP message is also a message which is transmitted based on a Basic CID of the MS.

'Management Message Type' refers to information indicating a type of the transmission message. When 'Management Message Type' is 51, it means that the transmission message is the MOB_SLP-RSP message. 'Length_of_Data' refers to information indicating the number of bytes of a power saving class. 'Sleep_Approved' is information indicating approval/disapproval of an activation or deactivation request for a corresponding power saving class of the MS. Herein, when a value of the Sleep_Approved is '1' and a value of 'Operation' is '1' (activation), 'Start_frame_number' is comprised. When a value of the Sleep_Approved is '1' and a value of 'Definition' is '1', Power_Saving_Class_Type, Direction, Initial-Sleep Window, Listening Window, final-sleep window base, final-sleep window exponent, MOB_TRF-IND required, and TTWF are comprised.

Herein, when a value of the Definition is '1', the same IEs are comprised as the IEs that are comprised when a value of the Definition described in connection with the MOB_SLP-REQ message is '1'. Further, the following IEs are additionally comprised.

<1> SLPID: In the case where TRF-IND Required is set to '1', if the BS transmits to the MS a MOB_TRF-IND message comprising an affirmative indication, i.e., an identifier of the MS, as described in connection with the MOB_SLP-REQ message, the BS allocates a SLPID for allowing the MS to recognize the affirmative indication when it receives the MOB_TRF-IND message.

<2> Macro Diversity HandOver/Fast Base Station Switching duration (MDHO/FBSS duration): It refers to information indicating a valid duration of an adjacent diversity BS set and anchor BS information when MDHO/FBSS between a BS and an MS is supported, or when the MS activates the corresponding power saving class.

In addition, the MOB_TRF-IND required is applied only in the power saving class Type 1, and it indicates that the BS should transmit at least one MOB_TRF-IND message to the MS during every listening window.

(3) MOB_TRF-IND Message

The MOB_TRF-IND message is a message that the BS transmits to the MS during the listening window, and a message indicating existence/nonexistence of the data the BS will transmit to the MS. The MOB_TRF-IND message, unlike the MOB_SLP-REQ message or the MOB_SLP-RSP message, is a message which is transmitted in a broadcasting or multicasting manner. An exemplary format of the MOB TRF-IND message is shown in Table 3.

TABLE 3

| Syntax | Size (bits) | Notes |
|---|---|---|
| MOB_TRF-IND_Message_format( ) { | | |
|   Management message type = 52 | 8 | |
|   FMT | 1 | |
|   if (FMT== 0) { | | |

TABLE 3-continued

| Syntax | Size (bits) | Notes |
|---|---|---|
| SLPID Group Indication bit-map | 32 | N-th bit of SLPID-Group information bit-map {MSB corresponds to N = 0} is allocated to SLPID Group that includes MS with SLPID values from N * 32 to N * 32 + 31. Meaning of this bit 0: There is no traffic for all the 32 MSs which belong to the SLPID-Group 1: There is traffic for at least one MS in SLPID-Group |
| Traffic Indication Bitmap | variable | Traffic Indication bit-map comprises the multiples of 32-bit long Traffic Indication unit A Traffic Indication unit for 32 SLPIDs is added to MOB_TRF-IND message whenever its SLPID Group is set to 1. 32 bits of Traffic Inidcation Unit (starting from MSB) are allocated to MS in the ascending order of their SLPID values: 0: Negative indication 1: Positive indication |
| }else{ | | |
| Num_Pos | 8 | Number of CIDs following |
| for (i=0; i<Num_Pos: i++) { | | |
| SLPIDs | 10 | |
| } | | |
| } | | |
| Padding | variable | If needed, for alignment to byte boundary |
| TLV encoded Items | variable | |
| } | | |

As shown in Table 3, the exemplary MOB_TRF-IND message is a message indicating existence/nonexistence of the data the BS will transmit to the MS. The MS receives the MOB_TRF-IND message during the listening window, and determines whether it will transition from the sleep mode to the awake mode, or will continue to maintain the sleep mode.

If the MS makes a mode transition to the awake mode, the MS checks frame synchronization. When the frame sequence number that the MS expects is not coincident with the current frame sequence number, the MS can request retransmission of the data lost in the awake mode. However, the MS can continue to maintain the sleep mode, when the MS has failed to receive the MOB_TRF-IND message during the listening window, or when the MS has received a message comprising non-affirmative indication, for example, information indicating nonexistence of the data the MS will receive, even though it has received the MOB_TRF-IND message.

Meanwhile, the MOB_TRF-IND message also comprises a plurality of IEs. 'Management Message Type' is information indicating a type of the transmission message. When 'Management Message Type' is 52, it denotes that the transmission message is the MOB_TRF-IND message. 'FMT' indicates whether it will use an SLPID bitmap format or an SLPID format as a format of the MOB_TRF-IND message.

(4) BW-REQ and UL Sleep Control Header

The BW-REQ and UL Sleep Control header is a bandwidth request header that the MS transmits to the BS in order to activate or deactivate the power saving class. When deactivating the corresponding power saving class, the MS can make a bandwidth request for a corresponding connection together. An exemplary format of the BW-REQ and UL Sleep Control header is shown in Table 4.

TABLE 4

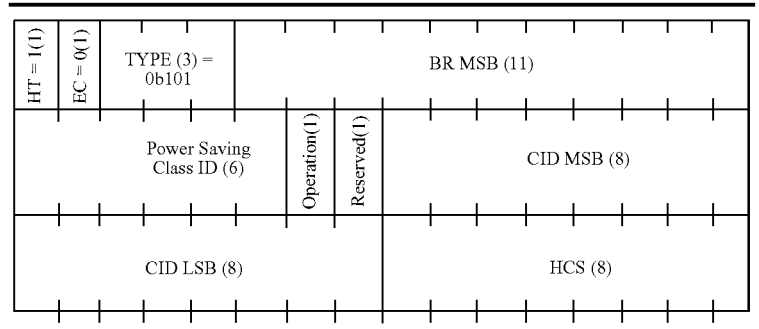

The IEs of the BW-REQ and UL Sleep Control header, shown in Table 4 as an example, have been described in connection with the MOB_SLP-REQ message, so a detailed description thereof will be omitted herein.

(5) Downlink (DL) Sleep Control Extended Subheader

The DL Sleep Control Extended Subheader is a subheader that the BS transmits to the MS in order to activate or deactivate the power saving class. An exemplary format of the DL Sleep Control Extended Subheader is shown in Table 5.

TABLE 5

| Name | Size (bits) | Description |
| --- | --- | --- |
| Power_Saving_Class_ID | 6 | Power Saving Class ID this command refers to. |
| Operation | 1 | 1 = activate Power Saving Class<br>0 = de-activate Power Saving Class |
| Final_Sleep_Window_Exponent | 3 | For Power Saving Class Type III only: assigned factor by which the final-sleep window base is multiplied in order to calculate the duration of single sleep window requested by the message. |
| Final_Sleep_Window_Base | 10 | For Power Saving Class Type III only: the base for duration of single sleep window requested by the message. |
| Reserved | 4 | |

The IEs of the DL Sleep Control Extended Subheader, shown in Table 5, have been described in connection with the MOB_SLP-RSP message, so a detailed description thereof will be omitted herein.

As described above, in the sleep mode operation of the IEEE 802.16e communication system, regarding the power saving class Type 1, the MS can maintain the sleep mode or deactivate the power saving class, when it receives a MAC SDU from the BS during the listening window according to the TTWF. However, when the MS intends to maintain the sleep mode, a time when the MS desires to make a mode transition back to the sleep mode after the listening window expired is not yet established. In addition, the TTWF is initially preset in the MOB_SLP-REQ message and the MOB_SLP-RSP message that the MS and the BS exchange.

(6) Ranging Request (RNG-REQ) Message

The RNG-REQ message can be used for controlling an operation of defining and activating/deactivating the power saving class. To this end, the RNG-REQ message comprises therein a compound Type-Length-Value (TLV) encoding which is the following power saving class parameter.

As shown in Table 6 as an example, the compound TLV encoding comprises therein several IEs indicating characteristics of the power saving class, shown below in Table 7 as an example. As to the compound TLV encoding, the IEs described in connection with the MOB_SLP-REQ message are defined in the form of TLV encoding. Each TLV encoding IE is similar to that described in connection with the MOB_SLP-REQ message, so a detailed description thereof will be omitted.

However, for each TLV encoding IE, overhead of a total of 2 bytes—1 byte for a Type field and 1 byte for a Length field—additionally occur. In addition, when the MS performs definition, deactivation and activation on a plurality of power saving classes, there are as many TLV encodings as the number of power saving classes.

When the MS performs handover, i.e., performs network re-entry, it can only perform the definition on the power saving class to a target BS. In other words, the MS cannot simultaneously perform definition and activation on an arbitrary power saving class before it completes the network re-entry. That is, the MS performs definition on the power saving class, and after completing the network re-entry, redefines the power saving class using the RNG-REQ message or performs activation. The MS can perform redefinition, activation and deactivation through transmission/reception of the MOB_SLP-REQ/MOB_SLP-RSP messages. In addition, after completion of the network re-entry, the MS can perform redefinition, activation and deactivation using the BW-REQ and UL Sleep Control header or the DL Sleep Control Extended Subheader.

TABLE 6

| Name | Type (1 byte) | Length | Value (variable-length) | PHY scope |
| --- | --- | --- | --- | --- |
| Power_Saving_Class_Parameters | 21 | variable | Compound TLV to specify Power Saving Class definition and/or operation | — |

TABLE 7

| Name | Type (1 byte) | Length | Value (variable-length) |
|---|---|---|---|
| Power_Saving_Class ID | 2 | 1 | Assigned power saving class identifier. Not used for RNG-REQ message. |
| Power_Saving_Class_Type | 3 | 1 | Power saving class type as specified in 6.3.2.3. |
| Start_frame_number | 4 | 1 | Start frame number for first sleep window. Not used for RNG-REQ message. |
| initial-sleep window | 5 | 1 | Initial sleep window. |
| listening window | 6 | 1 | Assigned duration of MS listening interval (measured in frames). |
| final-sleep window base | 7 | 1 | Assigned final value for sleep interval (measured in frames) - base. |
| final-sleep window exponent | 8 | 1 | Assigned final value for sleep interval (measured in frames) - exponent. |
| SLPID | 9 | 1 | A number assigned by the BS whenever an MS is instructed to enter sleep mode. |
| CID | 10 | 2 | Connection identifier to be included into the power saving class. There may be several TLVs of this type in a single compound Power Saving Class Parameters TLV. |
| Direction | 11 | 1 | Direction for management connection, which is added to power saving class. |

(7) Ranging Response (RNG-RSP) Message

The BS transmits a response to the definition, deactivation and activation request for the power saving class based on the RNG-REQ message that the MS transmits, using the RNG-RSP message. In addition, the BS can transmit to the MS its command rather than a response to the request of the MS in an unsolicited manner. In other words, the BS can define, deactivate and activate the corresponding power saving class through the RNG-RSP message even without reception of the RNG-REQ message that the MS transmits.

To this end, a compound TLV encoding, which is a power saving class parameter shown in Table 8 as an example, is defined in the RNG-RSP message.

TABLE 8

| Name | Type (1 byte) | Length | Value (variable-length) | PHY scope |
|---|---|---|---|---|
| Power_Saving Class_Parameters | 27 | variable | Compound TLV to specify power saving class definition and/or operation | All |

TLV encoding IEs comprised in the compound TLV encoding use the TLV encoding IEs comprised in the compound TLV encoding of the RNG-REQ message in the same way. That is, when defining the power saving class of the sleep mode, the RNG-REQ message and the RNG-RSP message use different types of compound TLV encodings, but they can use the same type of TLV encoding IEs in the compound TLV encoding.

When the power saving class is defined as described above, a plurality of IEs are needed. However, the IEs comprised in the compound TLV encodings of the RNG-REQ message and the RNG-RSP message do not comprise all IEs that define the power saving class. That is, not all IEs that define the power saving class in the MOB_SLP-REQ message and the MOB_SLP-RSP message are defined in the compound TLV encodings of the RNG-REQ message and the RNG-RSP message.

Table 9 shows an example of a comparison in IEs between the MOB_SLP-REQ message/MOB_SLP-RSP message and the RNG-REQ message/the RNG-RSP message.

TABLE 9

| | MOB_SLP-REQ/RSP | PSC parameters in RNG-REQ/RSP | Note |
|---|---|---|---|
| Sleep_Approved | —/0 | Not Required | |
| Operation | 0/0 | 0/0 | |
| Definition | 0/0 | 0/0 | |
| Start_Frame_Number | 0/0 | 0/0 | When Operation = 1 |
| Stop CQI Allocation Flag | —/0 | —/0 | When Operation = 1 |
| Power Saving Class ID | 0/0 | 0/0 | |
| Power_Saving Class Type | 0/0 | 0/0 | When Definition = 1 |
| Direction | 0/0 | 0/0 | When Definition = 1 |
| TRF-IND-Required | 0/0 | 0/0 | When Definition = 1 |

TABLE 9-continued

| | MOB_SLP-REQ/RSP | PSC parameters in RNG-REQ/RSP | Note |
|---|---|---|---|
| Traffic_Triggered_Wakening_flag | 0/0 | | When Definition = 1 and Power Saving Class Type = 1 |
| Initial-Sleep Window | 0/0 | 0/0 | When Definition = 1 |
| Listening-Window | 0/0 | 0/0 | When Definition = 1 |
| Final Sleep Window base | 0/0 | 0/0 | When Definition = 1 |
| Final Sleep Window exponent | 0/0 | 0/0 | When Definition = 1 |
| Number_of_CIDs | 0/0 | Not Required | When Definition = 1 |
| CID | 0/0 | 0/0 | When Definition = 1 |
| SLPID | —/0 | 0/0 | When Definition = 1 && TRF-IND_Required = 1 |
| MDHO/FBSS duration | —/0 | | When MS supports MDHO or FBSS |

As shown in Table 9, the compound TLV encoding of the RNG-REQ message/RNG-RSP message does not comprise Sleep_Approved, TTWF, Number_of_CIDs, and MDHO/FBSS duration, which are IEs of the MOB_SLP-REQ message/MOB_SLP-RSP message. However, the IEs, which are not comprised in the RNG-REQ message/RNG-RSP message, should also be defined in the compound TLV encoding.

Meanwhile, the IEs comprised in the compound TLV encodings in the RNG-REQ message/RNG-RSP message are composed of 3 fields, namely Type, Length and Value. In order to indicate a type and a length of the Value field, 2-byte overhead, i.e., overhead of the 1-byte Type field and the 1-byte Length field, always occurs. In addition, since the IEs comprised in the compound TLV encodings in the RNG-REQ message and the RNG-RSP message are usually comprised, it is not possible to make the best use of the merits of the TLV capable of selectively comprising IEs. That is, no management problem occurs even though there is no Type and Length fields for the IEs comprised in the compound TLV encoding in the RNG-REQ message and the RNG-RSP message. Meanwhile, the RNG-REQ message/RNG-RSP message may occupy many frequency/symbol regions, when a lower Modulation and Coding Scheme (MCS) level is applied. Accordingly, there is a need for a system and method for transmitting and receiving ranging information in a sleep mode.

SUMMARY OF THE INVENTION

An aspect of the present invention is to address at least the above-mentioned problems and/or disadvantages and to provide at least the advantages described below. Accordingly, an aspect of the present invention is to provide a system and method for transmitting and receiving ranging information in a sleep mode in a communication system.

Another aspect of the present invention is to provide a ranging information transmission/reception system and method for reducing message overhead by defining a power saving class in a sleep mode in a communication system.

Yet another aspect of the present invention is to provide a ranging information transmission/reception system and method for reducing a resource waste caused by message transmission by reducing message overhead in a communication system.

According to one aspect of the present invention, a method for transmitting a ranging response message to a Mobile Station (MS) by a Base Station (BS) in a communication system is provided. The method comprises transmitting a ranging response message to the MS, wherein the ranging response message comprises a Unified Type-Length-Value (TLV) encoding for a power saving class parameter and wherein the Unified TLV encoding comprises only a value parameter for each of a plurality of Information Elements (IEs) used for defining a power saving class.

According to another aspect of the present invention, a system for transmitting a ranging response message in a communication system is provided. The system comprises a Base Station (BS) for transmitting a ranging response message to a Mobile Station (MS), wherein the ranging response message comprises a Unified Type-Length-Value (TLV) encoding for a power saving class parameter and wherein the Unified TLV encoding comprises only a value parameter for each of a plurality of Information Elements (IEs) used for defining a power saving class.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which:

FIG. 2 is a diagram illustrating proposed Unified TLV encoding parameters for power saving classes in a communication system according to a first exemplary embodiment of the present invention; and FIG. 3 is a diagram illustrating Unified TLV encoding parameters for power saving classes in a communication system according to a second exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
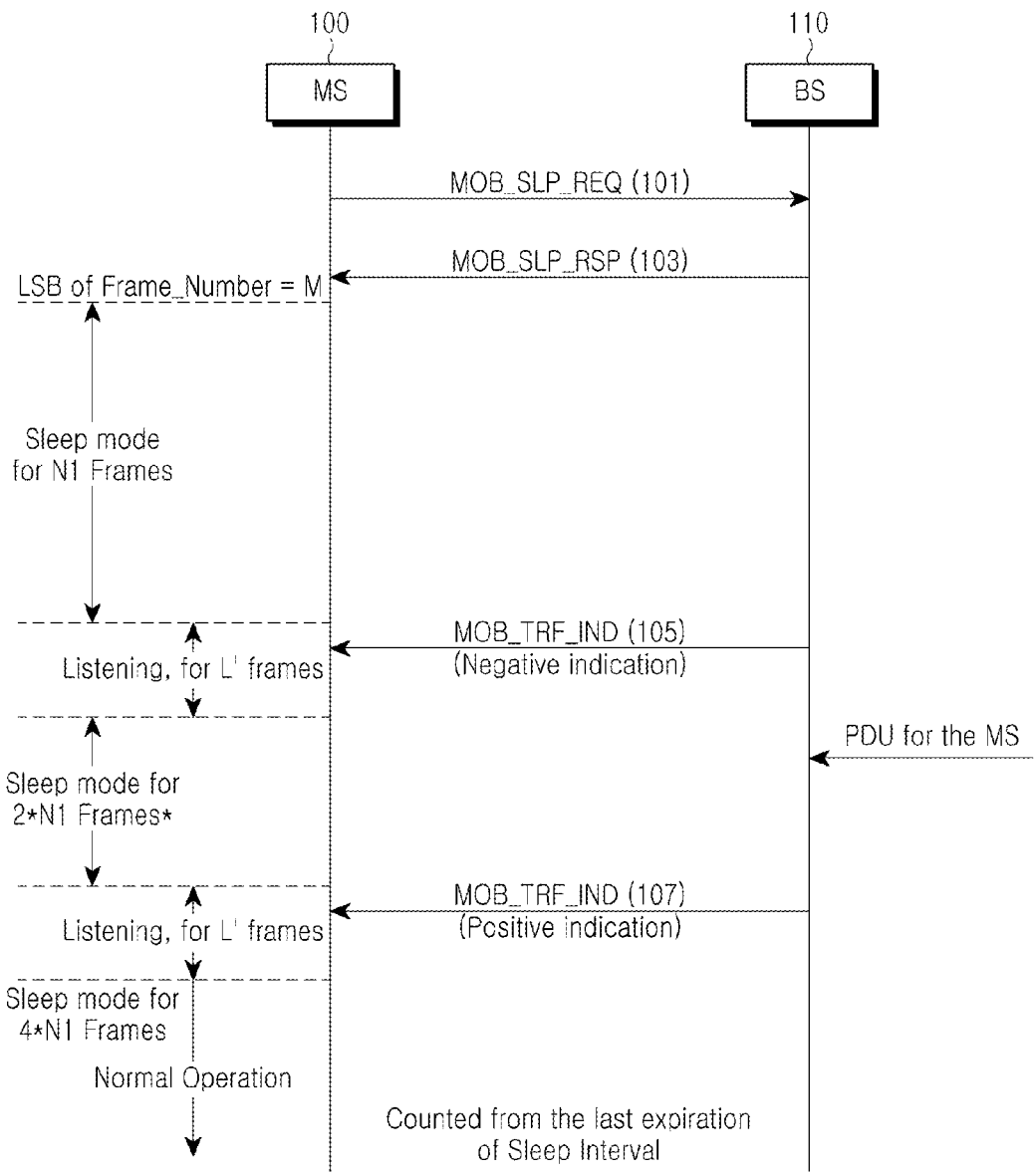
FIG. 1 is a diagram illustrating a conventional process of performing a sleep mode operation in a communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms used herein are defined based on functions in the present invention and may vary according to users, operators' intention or usual practices. Therefore, the definition of the terms should be made based on contents throughout the specification.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a system and method for transmitting and receiving ranging information in a sleep mode in a communication system. In an exemplary implementation, the present invention defines a Unified TLV encoding in the power saving class parameter TLV used for defining, activating and deactivating a sleep-mode power saving class comprised in a RaNGing-REQuest (RNG-REQ) message and a RaNGing-RSPonse (RNG-RSP) message.

The proposed Unified TLV encoding comprises all Information Elements (IEs) that specify the power saving class. The Unified TLV encoding reduces a length of the RNG-REQ message/RNG-RSP message by omitting the Type field and the Length field from all IEs specifying the power saving class. Although a description of the exemplary embodiments of the present invention will be described with reference to an IEEE 802.16e communication system, the ranging information transmission/reception system and method proposed by the present invention can be applied not only to the IEEE 802.16e communication system but also to other communication systems.

First Exemplary Embodiment

With reference to FIG. 2, a definition will now be given of a Unified TLV encoding for power saving classes.

FIG. 2 is a diagram illustrating proposed Unified TLV encoding parameters for power saving classes in a communication system according to a first exemplary embodiment of the present invention.

Referring to FIG. 2, the Type field and the Length field are omitted from the IEs comprised in TLV encodings of an RNG-REQ message and an RNG-RSP message.

The Value field of the Unified TLV encoding parameters comprises a plurality of IEs. 'Operation' refers to information indicating activation/deactivation of the power saving class, and 'Power_Saving_Class_ID' denotes an identifier for indicating the power saving class.

When Operation is 1, Start_Frame_Number and Stop_CQI_Allocation_Flag are comprised.

When Definition is 1, IEs indicating characteristics of the corresponding Power_Saving_Class_ID are comprised. The IEs comprise Power_Saving_Class_Type, TRF-IND_Required, Traffic_Triggered_Wakening_Flag, Direction, MDHO/FBSS_Support, Initial-Sleep Window, Listening Window, Final Sleep Window base, Final Sleep Window exponent, Number_of_CIDs, CID, etc.

That is, since the IEs described in connection with Table 7 are all comprised in order to specify the power saving class, all the IEs can be comprised in the Value field of one Unified TLV encoding parameter. A description of all the IEs has been given above, so a detailed description thereof will be omitted herein.

According to the first exemplary embodiment of the present invention, a total number of bytes necessary for defining the power saving class can be reduced. That is, the first exemplary embodiment of the present invention can reduce the total message length by omitting the Type field and Length field from all the IEs. For example, at least 18 parameters are needed to specify one power saving class. In this case, use of the TLV encoding parameters proposed by the first exemplary embodiment of the present invention can reduce overhead by a total of 34 bytes (34=18*2−2). That is, the first exemplary embodiment of present invention can generate power saving class information which is 50% less than that of the conventional method, by reducing the overhead which is greater than the total length of the TLV encoding parameter values proposed in FIG. 2.

The Unified TLV encoding parameters shown in FIG. 2 do not have the Sleep_Approved parameter described in connection with Table 2. This means that a power saving class with Sleep_Approved value=0 is not comprised in the power saving class parameter TLV in the RNG-RSP message. That is, a power saving class with Sleep_Approved value=1 is comprised in the power saving class parameter TLV in the RNG-RSP message.

A MDHO/FBSS_Support field is comprised in the Unified TLV encoding parameters shown in FIG. 2. The MDHO/FBSS_Support field is a field indicating MDHO/FBSS supportability between a Mobile Station (MS) and a Base Station (BS). If the MDHO/FBSS is supported, the MDHO/FBSS duration field is comprised as shown in Table 2.

When there is a plurality of power saving classes, the TLV encoding parameters for the power saving classes are mapped to the plurality of power saving classes, respectively. Accordingly, the Unified TLV encoding parameters for the power saving classes, proposed in the first exemplary embodiment, could be comprised in the power saving class parameter TLV described in connection with Table 6 and Table 8, the number of Unified TLV encoding parameters being equal to the number of power saving classes.

As a result, the MS and the BS can define the power saving class using the Unified TLV encoding parameters shown in FIG. 2, and can achieve a high efficiency in terms of backward compatibility.

Second Exemplary Embodiment

In the first exemplary embodiment, the parameters in the MOB_SLP-REQ message/MOB_SLP-RSP message are all comprised without condition. However, some IEs may not be comprised according to a power saving class type. To this end, Table 10 presents IE inclusion conditions.

TABLE 10

|  | PSC Type I | PSC Type II | PSC Type III |
|---|---|---|---|
| TRF-IND_Required | O | X | X |
| Traffic_Triggered_Wakening_flag | O | X | X |
| SLPID if TRF-IND Required = 1 | O | X | X |
| Initial-Sleep Window | O | O | X |
| Listening-Window | O | O | X |
| Final Sleep Window base | O | X | O |
| Final Sleep Window exponent | O | X | O |

As shown in Table 10, the IEs can be selectively comprised or not comprised in the RNG-REQ message/RNG-RSP message according to the power saving class type.

With reference to FIG. 3, a description will now be made of proposed Unified TLV encoding parameters for power saving classes in a communication system according to a second exemplary embodiment of the present invention.

FIG. 3 is a diagram illustrating Unified TLV encoding parameters for power saving classes in a communication system according to the second exemplary embodiment of the present invention.

Referring to FIG. 3, the Unified TLV encoding parameters proposed by the second exemplary embodiment of the present invention comprise herein the IE inclusion conditions based on the power saving class type, shown in Table 10. If the power saving class type is 1 (PSC Type I), TRF-IND_Required, Traffic_Triggered_Wakening_Flag, Initial-Sleep Window, Listening-Window, Final Sleep Window base, Final Sleep Window exponent, and SLPID are all comprised.

When the power saving class type is 2 (PSC Type II), Initial-Sleep Window and Listening-Window are comprised. Further, when the power saving class type is 3 (PSC Type III), Final Sleep Window base and Final Sleep Window exponent are comprised.

As described above, when the power saving class type is 2 or 3, it is possible to reduce a greater number of bytes compared to when the power saving class type is 1.

As is apparent from the foregoing description, exemplary embodiments of the present invention propose the Unified TLV encoding parameters in the sleep mode in the communication system, thereby reducing the length of the RNG-REQ message/RNG-RSP message exchanged between the MS and the BS, and thus contribute to a reduction in the frequency/symbol regions used for the message transmission.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a ranging response message to a Mobile Station (MS) by a Base Station (BS) in a communication system, the method comprising:
transmitting the ranging response message to the MS,
wherein the ranging response message comprises a Unified Type-Length-Value (TLV) encoding for a power saving class parameter,
wherein the Unified TLV encoding comprises only a value parameter for each of a plurality of Information Elements (IEs) used for defining a power saving class,
wherein the plurality of IEs comprises at least one of an Operation value parameter, a Power_Saving_Class_ID value parameter, and a Definition value parameter,
wherein when a value of the Operation value parameter indicates a first value, the plurality of IEs further comprises at least one of a Start_Frame_Number value parameter and a Stop Channel Quality Information Allocation Flag (Stop_CQI_Allocation_Flag) value parameter, and
wherein a number of value parameters comprised in the Unified TLV encoding is equal to a number of power saving classes.

2. The method of claim 1,
wherein when a value of the Definition value parameter indicates a second value, the plurality of IEs further comprises at least one of a Power_Saving_Class_Type value parameter, a TRaFfic-INDication Required (TRF-IND_Required) value parameter, a Traffic_Triggered_Wakening_Flag value parameter, a Direction value parameter, a Macro Diversity HandOver/Fast Base Station Switching Support (MDHO/FBSS_Support) value parameter, an Initial-Sleep Window value parameter, a Listening-Window value parameter, a Final Sleep Window base value parameter, a Final Sleep Window exponent value parameter, a Number_of_CIDs value parameter, and a Connection Identifier (CID) value parameter.

3. The method of claim 1,
wherein when a value of the Definition value parameter indicates a fourth value, the plurality of IEs further comprises a Power_Saving_Class_Type value parameter.

4. The method of claim 3, wherein when a value of the Power_Saving_Class_Type value parameter indicates a fifth value, the plurality of IEs further comprises at least one of a TRF-IND_Required value parameter, a Traffic_Triggered_Wakening_Flag value parameter, an Initial-Sleep Window value parameter, a Listening-Window value parameter, a Final Sleep Window base value parameter, a Final Sleep Window exponent value parameter, and a SLeeP Identifier (SLPID) value parameter.

5. The method of claim 3, wherein when a value of the Power_Saving_Class_Type value parameter indicates a sixth value, the plurality of IEs further comprises at least one of an Initial-Sleep Window value parameter and a Listening-Window value parameter.

6. The method of claim 3, wherein when a value of the Power_Saving_Class_Type value parameter indicates a seventh value, the plurality of IEs further comprises at least one of a Final Sleep Window base value parameter and a Final Sleep Window exponent value parameter.

7. The method of claim 1, wherein the Unified TLV encoding omits a Type field and a Length field from each of the plurality of IEs used for defining the power saving class.

8. A Base Station (BS) for transmitting a ranging response message in a communication system, the BS comprising:
a transmitter for transmitting the ranging response message to a Mobile Station (MS),
wherein the ranging response message comprises a Unified Type-Length-Value (TLV) encoding for a power saving class parameter,
wherein the Unified TLV encoding comprises only a value parameter for each of a plurality of Information Elements (IEs) used for defining a power saving class,
wherein the plurality of IEs comprises at least one of an Operation value parameter, a Power_Saving_Class_ID value parameter, and a Definition value parameter,
wherein when a value of the Operation value parameter indicates a first value, the plurality of IEs further comprises at least one of a Start_Frame_Number value parameter and a Stop Channel Quality Information Allocation Flag (Stop_CQI_Allocation_Flag) value parameter, and
wherein a number of value parameters comprised in the Unified TLV encoding is equal to a number of power saving classes.

9. The BS of claim 8,
wherein when a value of the Definition value parameter indicates a second value, the plurality of IEs further comprises at least one of a Power_Saving_Class_Type value parameter, a TRaFfic-INDication Required (TRF-IND_Required) value parameter, a Traffic_Triggered_Wakening_Flag value parameter, a Direction value parameter, a Macro Diversity HandOver/Fast Base Station Switching Support (MDHO/FBSS_Support) value parameter, an Initial-Sleep Window value parameter, a Listening-Window value parameter, a Final Sleep Window base value parameter, a Final Sleep Window exponent value parameter, a Number_of_CIDs value parameter, and a Connection Identifier (CID) value parameter.

10. The BS of claim 8,
wherein when a value of the Definition value parameter indicates a fourth value, the plurality of IEs further comprises a Power_Saving_Class_Type value parameter.

11. The BS of claim 10, wherein when a value of the Power_Saving_Class_Type value parameter indicates a fifth value, the plurality of IEs further comprises at least one of a TRF-IND_Required value parameter, a Traffic_Triggered_Wakening_Flag value parameter, an Initial-Sleep Window value parameter, a Listening-Window value parameter, a Final Sleep Window base value parameter, a Final Sleep Window exponent value parameter, and a SLeeP Identifier (SLPID) value parameter.

12. The BS of claim 10, wherein when a value of the Power_Saving_Class_Type value parameter indicates a sixth value, the plurality of IEs further comprises at least one of an Initial-Sleep Window value parameter and a Listening-Window value parameter.

13. The BS of claim 10, wherein when a value of the Power_Saving_Class_Type value parameter indicates a seventh value, the plurality of IEs further comprises at least one of a Final Sleep Window base value parameter and a Final Sleep Window exponent value parameter.

14. The BS of claim 8, wherein the Unified TLV encoding omits a Type field and a Length field from each of the plurality of IEs used for defining the power saving class.

15. A method for transmitting a ranging request message to a Base Station (BS) by a Mobile Station (MS) in a communication system, the method comprising:
transmitting the ranging request message to the BS,
wherein the ranging request message comprises a Unified Type-Length-Value (TLV) encoding for a power saving class parameter,
wherein the Unified TLV encoding comprises only a value parameter for each of a plurality of Information Elements (IEs) used for defining a power saving class,
wherein the plurality of IEs comprises at least one of an Operation value parameter, a Power_Saving_Class_ID value parameter, and a Definition value parameter,
wherein when a value of the Operation value parameter indicates a first value, the plurality of IEs further comprises at least one of a Start_Frame_Number value parameter and a Stop Channel Quality Information Allocation Flag (Stop_CQI_Allocation_Flag) value parameter, and
wherein a number of value parameters comprised in the Unified TLV encoding is equal to a number of power saving classes.

16. The method of claim 15,
wherein when a value of the Definition value parameter indicates a second value, the plurality of IEs further comprises at least one of a Power_Saving_Class_Type value parameter, a TRaFfic-INDication Required (TRF-IND_Required) value parameter, a Traffic_Triggered_Wakening_Flag value parameter, a Direction value parameter, a Macro Diversity HandOver/Fast Base Station Switching Support (MDHO/FBSS_Support) value parameter, an Initial-Sleep Window value parameter, a Listening-Window value parameter, a Final Sleep Window base value parameter, a Final Sleep Window exponent value parameter, a Number_of_CIDs value parameter, and a Connection Identifier (CID) value parameter.

17. The method of claim 15,
wherein when a value of the Definition value parameter indicates a fourth value, the plurality of IEs further comprises a Power_Saving_Class_Type value parameter.

18. The method of claim 17, wherein when a value of the Power_Saving_Class_Type value parameter indicates a fifth value, the plurality of IEs further comprises at least one of a TRF-IND_Required value parameter, a Traffic_Triggered_Wakening_Flag value parameter, an Initial-Sleep Window value parameter, a Listening-Window value parameter, a Final Sleep Window base value parameter, a Final Sleep Window exponent value parameter, and a SLeeP Identifier (SLPID) value parameter.

19. The method of claim 17, wherein when a value of the Power_Saving_Class_Type value parameter indicates a sixth value, the plurality of IEs further comprises at least one of an Initial-Sleep Window value parameter and a Listening-Window value parameter.

20. The method of claim 17, wherein when a value of the Power_Saving_Class_Type value parameter indicates a seventh value, the plurality of IEs further comprises at least one of a Final Sleep Window base value parameter and a Final Sleep Window exponent value parameter.

21. The method of claim 15, wherein the Unified TLV encoding omits a Type field and a Length field from each of the plurality of IEs used for defining the power saving class.

22. A Mobile Station (MS) for transmitting a ranging request message in a communication system, the MS comprising:
a transmitter for transmitting the ranging request message to a Base Station (BS),
wherein the ranging request message comprises a Unified Type-Length-Value (TLV) encoding for a power saving class parameter,
wherein the Unified TLV encoding comprises only a value parameter for each of a plurality of Information Elements (IEs) used for defining a power saving class,
wherein the plurality of IEs comprises at least one of an Operation value parameter, a Power Saving Class ID value parameter, and a Definition value parameter,
wherein when a value of the Operation value parameter indicates a first value, the plurality of IEs further comprises at least one of a Start_Frame_Number value parameter and a Stop Channel Quality Information Allocation Flag (Stop_CQI_Allocation_Flag) value parameter, and
wherein a number of value parameters comprised in the Unified TLV encoding is equal to a number of power saving classes.

23. The MS of claim 22,
wherein when a value of the Definition value parameter indicates a second value, the plurality of IEs further comprises at least one of a Power_Saving_Class_Type value parameter, a TRaFfic-INDication Required (TRF-IND_Required) value parameter, a Traffic_Triggered_Wakening_Flag value parameter, a Direction value parameter, a Macro Diversity HandOver/Fast Base Station Switching Support (MDHO/FBSS_Support) value parameter, an Initial-Sleep Window value parameter, a Listening-Window value parameter, a Final Sleep Window base value parameter, a Final Sleep Window exponent value parameter, a Number_of_CIDs value parameter, and a Connection Identifier (CID) value parameter.

24. The MS of claim 22,
wherein when a value of the Definition value parameter indicates a fourth value, the plurality of IEs further comprises a Power_Saving_Class_Type value parameter.

25. The MS of claim 24, wherein when a value of the Power_Saving_Class_Type value parameter indicates a fifth value, the plurality of IEs further comprises at least one of a TRF-IND_Required value parameter, a Traffic_Triggered_Wakening_Flag value parameter, an Initial-Sleep Window value parameter, a Listening-Window value parameter, a Final Sleep Window base value parameter, a Final Sleep Window exponent value parameter, and a SLeeP Identifier (SLPID) value parameter.

26. The MS of claim 24, wherein when a value of the Power_Saving_Class_Type value parameter indicates a sixth value, the plurality of IEs further comprises at least one of an Initial-Sleep Window value parameter and a Listening-Window value parameter.

27. The MS of claim 24, wherein when a value of the Power_Saving_Class_Type value parameter indicates a seventh value, the plurality of IEs further comprises at least one of a Final Sleep Window base value parameter and a Final Sleep Window exponent value parameter.

28. The MS of claim 22, wherein the Unified TLV encoding omits a Type field and a Length field from each of the plurality of IEs used for defining the power saving class.

* * * * *